United States Patent
Lund et al.

(10) Patent No.: US 10,352,294 B2
(45) Date of Patent: Jul. 16, 2019

(54) WIND TURBINE PROVIDED WITH A SLAT ASSEMBLY

(75) Inventors: Brian Lund, Esbjerg (DK); Jean-Guillaume Jeremiasz, Odense (DK); Lars Erik Jensen, Hedensted (DK); Martin Nielsen, Vissenbjerg (DK); Mohammed Mehraj Anwar, Bangalore (IN); Sreeram Kottumuklu Radhakrishnan, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 953 days.

(21) Appl. No.: 13/640,635

(22) PCT Filed: Apr. 27, 2011

(86) PCT No.: PCT/EP2011/056633
§ 371 (c)(1),
(2), (4) Date: Oct. 11, 2012

(87) PCT Pub. No.: WO2011/134985
PCT Pub. Date: Nov. 3, 2011

(65) Prior Publication Data
US 2013/0052033 A1    Feb. 28, 2013

(30) Foreign Application Priority Data
Apr. 27, 2010   (EP) ..................................... 10161196

(51) Int. Cl.
*F03D 1/06*   (2006.01)

(52) U.S. Cl.
CPC ......... *F03D 1/0641* (2013.01); *F03D 1/0633* (2013.01); *F03D 1/0675* (2013.01);
(Continued)

(58) Field of Classification Search
CPC .... F03D 1/0658; F03D 1/0641; F03D 1/0683; F03D 1/0633; F03D 1/0675;
(Continued)

(56) References Cited

U.S. PATENT DOCUMENTS

| | | | | |
|---|---|---|---|---|
| 457,384 | A | * | 8/1891 | Stoner ...................... F03D 3/00 416/10 |
| 2,026,482 | A | * | 12/1935 | Mattioli .................. B64C 23/06 244/198 |

(Continued)

FOREIGN PATENT DOCUMENTS

| CA | 2425447 A1 | 10/2004 |
|---|---|---|
| EP | 2006537 A2 | 12/2008 |

(Continued)

OTHER PUBLICATIONS

Mickeler, WO 2009/146810 English Machine Translation, Description Translated by Espacenet on Dec. 7, 2015.*
(Continued)

*Primary Examiner* — Ninh H. Nguyen
*Assistant Examiner* — Wayne A Lambert
(74) *Attorney, Agent, or Firm* — Nath, Goldberg & Meyer; Jerald L. Meyer; Tanya E. Harkins (57) ABSTRACT

The present invention relates to a wind turbine blade for a rotor of a wind turbine having a substantially horizontal rotor shaft, the rotor comprising a hub from which the blade extends in a substantially radial direction when mounted to the hub. The wind turbine blade comprises a profiled contour defining a leading edge and a trailing edge, a pressure side and a suction side connecting the leading edge and the trailing edge, the profiled contour generating a lift when being impacted by an incident air-flow, and a slat assembly located on the blade, the slat assembly comprising a slat
(Continued)

device being supported by a support device positioning the slat device in a distance from the surface of the blade.

32 Claims, 9 Drawing Sheets (52) U.S. Cl.
CPC ...... *F05B 2240/30* (2013.01); *F05B 2240/301* (2013.01); *Y02E 10/721* (2013.01); *Y10T 29/49318* (2015.01)

(58) Field of Classification Search
CPC ............ F05B 2240/30; F05B 2240/301; F05B 2240/313; F05B 2240/33; F05B 2240/34; F05B 2260/97; Y10T 29/49318; Y10T 29/49336; Y02E 10/721; B64C 11/346; B64C 2027/7261; B23P 6/002; B23P 15/02; B23P 2700/13
USPC ...... 416/23, 231 R, 231 B, 228, 235, 236 R, 416/237
See application file for complete search history.

(56) References Cited

U.S. PATENT DOCUMENTS

| | | | | |
|---|---|---|---|---|
| 2,135,887 A * | 11/1938 | Fairey | B64C 11/16 | 415/914 |
| 2,622,686 A * | 12/1952 | Chevreau | F03D 7/0252 | 416/23 |
| 4,105,363 A * | 8/1978 | Loth | F03D 3/061 | 416/111 |
| 4,148,594 A * | 4/1979 | Stafford | F03D 1/0658 | 416/102 |
| 4,255,085 A * | 3/1981 | Evans | F03D 3/061 | 416/178 |
| 4,339,230 A * | 7/1982 | Hill | B64C 27/473 | 416/226 |
| 4,720,244 A * | 1/1988 | Kluppel | B29C 70/02 | 416/224 |
| 5,850,990 A * | 12/1998 | Gevers | B64C 1/00 | 244/101 |
| 6,161,797 A * | 12/2000 | Kirk | B64C 9/12 | 244/1 N |
| 6,334,705 B1 * | 1/2002 | Weetman | B01F 3/04531 | 366/330.1 |
| 6,457,671 B1 | 10/2002 | Sherman | | |
| 6,789,769 B2 * | 9/2004 | Mau | B64C 23/005 | 244/130 |
| 6,886,778 B2 * | 5/2005 | McLean | B64C 3/10 | 244/45 R |
| 7,513,746 B2 * | 4/2009 | McCabe | F03D 1/025 | 415/4.3 |
| 7,582,977 B1 * | 9/2009 | Dehlsen | F03B 17/061 | 290/1 R |
| 7,900,876 B2 * | 3/2011 | Eberhardt | B64C 23/065 | 244/199.4 |
| 8,439,313 B2 * | 5/2013 | Rawdon | B64C 23/065 | 244/199.4 |
| 9,151,270 B2 * | 10/2015 | Eisenberg | F03D 1/0641 | |
| 9,175,666 B2 * | 11/2015 | Eisenberg | F03D 1/0633 | |
| 2001/0020665 A1 * | 9/2001 | Hayes | B64C 5/00 | 244/15 |
| 2001/0050322 A1 * | 12/2001 | Carter, Jr. | B64C 27/473 | 244/17.25 |
| 2007/0036659 A1 * | 2/2007 | Hibbard | B29C 63/22 | 416/233 |
| 2009/0081047 A1 * | 3/2009 | Koike | F03D 1/0675 | 416/223 R |
| 2009/0232656 A1 * | 9/2009 | Grabau | F03D 1/0641 | 416/223 R |
| 2010/0143152 A1 * | 6/2010 | Subramanian | F03D 1/06 | 416/90 R |
| 2010/0278657 A1 * | 11/2010 | Kildegaard | F03D 1/0675 | 416/241 R |
| 2011/0091326 A1 * | 4/2011 | Hancock | F03D 1/0675 | 416/225 |
| 2011/0142636 A1 * | 6/2011 | Curtin | F03D 1/0658 | 416/62 |
| 2011/0142676 A1 * | 6/2011 | Mohammed | F03D 1/0633 | 416/241 R |
| 2011/0142681 A1 * | 6/2011 | Fisher | F03D 1/0641 | 416/244 R |
| 2011/0268557 A1 * | 11/2011 | Drack | F03D 1/0633 | 415/119 |

FOREIGN PATENT DOCUMENTS

| | | |
|---|---|---|
| EP | 2107235 A1 | 10/2009 |
| EP | 2172648 A1 | 4/2010 |
| EP | 2282052 A2 | 2/2011 |
| EP | 2282052 A3 | 8/2016 |
| JP | 61167175 A | 7/1986 |
| JP | 2006009711 A | 1/2006 |
| JP | 2009074447 A | 4/2009 |
| WO | 2009097850 A2 | 8/2009 |
| WO | 2009097850 A3 | 8/2009 |
| WO | 2009/146810 A2 | 12/2009 |

OTHER PUBLICATIONS

Communication pursuant to Article 94(3) EPC dated Jan. 2, 2019 corresponding to European application No. 11716905.2-1007.

* cited by examiner

WIND TURBINE PROVIDED WITH A SLAT ASSEMBLY

This is a National Phase Application filed under 35 U.S.C. 371 as a national stage of PCT/EP2011/056633, filed on Apr. 27, 2011, and claims benefit from European Patent Application No. 10161196.0, filed on Apr. 27, 2010, the entire content of which is hereby incorporated by reference in its entirety.

TECHNICAL FIELD

The present invention relates to a wind turbine blade including a slat assembly. Further, the present invention relates to a blade or part of a blade for a rotor of a wind turbine having a substantially horizontal rotor shaft, the rotor comprising a hub, from which the blade extends substantially in a radial direction when mounted to the hub, the blade having a longitudinal direction with a tip end and a root end and a transverse direction, wherein the blade further comprises: a profiled contour including a pressure side and a suction side, as well as a leading edge and a trailing edge with a chord having a chord length extending there between, the profiled contour generating a lift when being impacted by an incident airflow. The invention further relates to a method of retrofitting a slat assembly to the surface of a wind turbine blade.

BACKGROUND ART

Ideally, a wind turbine blade of the airfoil type is shaped similarly to the profile of an aeroplane wing. On a wind turbine rotor the chord plane width of the blade as well as the first derivative thereof increase continuously with decreasing distance from the hub.

This results in the blade ideally being comparatively wide in the vicinity of the hub. This again results in problems when having to mount the blade to the hub, and, moreover, this causes great loads during operation of the blade, such as storm loads, due to the large surface area of the blade.

Therefore, over the years, construction of blades has developed towards a shape, where the blade consists of a root region closest to the hub, an airfoil region comprising a lift-generating profile furthest away from the hub and a transition region between the root region and the airfoil region. The airfoil region has an ideal or almost ideal blade shape with respect to generating lift, whereas the root region has a substantially circular cross-section, which reduces the storm loads and makes it easy and safe to mount the blade to the hub. Preferably, the root region diameter is constant along the entire root region. Due to the circular cross-section, the root region does not contribute to the energy production of the wind turbine and, in fact, lowers this a little because of drag. As it is suggested by the name, the transition region has a shape gradually changing from the circular shape of the root region to the airfoil profile of the airfoil region. Typically, the width of the blade in the transition region increases substantially linearly with increasing distance from the hub.

As for instance wind turbine blades for wind turbines have become bigger and bigger in the course of time, and they may now be more than 60 meters long, the demand for optimised aerodynamic performance has increased. The wind turbine blades are designed to have an operational lifetime of at least 20 years. Therefore, even small changes to the overall performance of the wind turbine blades may accumulate over the lifetime of a wind turbine blade to a high increase in financial gains, which surpasses the additional manufacturing costs relating to such changes. For many years, the focus areas for research have been directed towards improving the airfoil region of the blade, but during the recent few years more and more focus has been directed towards also improving the aerodynamic performance of the root and transition regions of the blade.

DISCLOSURE OF THE INVENTION

As the requirement for effectiveness of a wind turbine is increased, there is a need for increasing the effectiveness or performance of profiled contours or wind turbine blades.

This is achieved by an aspect of the present invention which relates to a wind turbine blade for a rotor of a wind turbine having a substantially horizontal rotor shaft, the rotor comprising a hub from which the blade extends in a substantially radial direction when mounted to the hub. The wind turbine blade comprises a profiled contour defining a leading edge and a trailing edge, a pressure side and a suction side connecting the leading edge and the trailing edge, the profiled contour generating a lift when being impacted by an incident airflow. The blade further comprises a slat assembly located on the blade, the slat assembly comprising a slat device being supported by a support device positioning the slat device in a distance, i.e. with a spacing, from the surface of the blade. It is contemplated that the slat device improves the aerodynamic performance of the blade.

Preferably, the slat assembly extends longitudinally or radially along the blade. In the present context, longitudinally extending means that the slat assembly parts are extending substantially in the longitudinal direction of the blade. Thus, the slat assembly parts typically have a first side and a second side as well as a first longitudinal end (nearest the root end) and a second longitudinal end (nearest the tip end).

Advantageously, the profiled contour is divided into: a root region having a substantially circular or elliptical profile closest to the hub, an airfoil region having a lift-generating profile furthest away from the hub, and optionally a transition region between the root region and the airfoil region, the transition region having a profile gradually changing in the radial direction from the circular or elliptical profile of the root region to the lift-generating profile of the airfoil region.

Advantageously, the slat assembly is attached permanently to the surface of the wind turbine blade and cannot be controlled actively. Thus, the orientation of the front surface is non-adjustable. The slat assembly may be adjusted when being assembled or mounted; preferably when the mounting has been performed, the orientation of the slat assembly is fixed.

When the wind turbine blade is impacted by an incident airflow, the profiled contour generates a lift force. When the blade is mounted on a wind turbine, the wind turbine hub begins to rotate due to the lift. By incident flow is meant the inflow conditions at a blade section during normal use of the blade, i.e. rotation on a wind turbine rotor. Thus, the incoming flow is the inflow formed by the resultant of the axial wind speed and the rotational component as it is seen by the local section of the blade.

The slats is advantageously formed with an airfoil profile having a pressure side and a suction side as well as a leading edge and a trailing edge.

Throughout the description, the term profiled contour is sometimes used to describe the outer shape of the main blade section, i.e. the blade itself, to which the slat assembly is attached.

The support device may comprise a wall hindering air flowing in a direction substantially perpendicular to the support. This is contemplated to guide the flow towards the trailing edge limiting flow separation in the area around the slat device. Thus, the wall is advantageously oriented in a transverse direction of the blade or an edgewise direction of the blade.

The slat assembly may comprise an endplate extending beyond the surface of the slat device. The endplate is contemplated to improve the airflow around the slat device, e.g. by extending the effective aspect ratio of the slat device and thereby increasing the load carried by the slat. Further, the endplate or winglet reduces tip vorticity at ends of the slat.

Further, the use of an endplate improves or raises the level of loads that the slat assembly may be subjected to without being damaged or disconnected from the wind turbine blade.

In an embodiment, the endplate is a winglet extending in a direction away from the surface of the blade and/or in a direction towards the blade. In these embodiments, the winglet is attached to for instance the slat device with a spacing to the blade. The slat device may comprise one or more endplates, and the endplates may extend in the same or different directions relative to the blade. The endplate or endplates may further act as a flow barrier means, such as a stall fence preventing for instance separation in propagating in the longitudinal direction of the blade. The flow barrier means are advantageously oriented substantially in the edgewise direction of the blade.

In an embodiment, the support device is attached to the slat device at one end of the slat device and/or the support device is attached to the slat device at the pressure side of the slat device. The attachment point of the support device to the slat device may be chosen depending on the desired aerodynamic properties of the blade and the slat device.

In an embodiment, the support device comprises a support foot adapted to the profiled contour at the area where the support device is fastened to the blade. The support foot is contemplated to improve the attachment force of the slat device to the blade. Being adapted to the profiled contour means that the foot substantially fits to the blade or in other words that the curvature of the foot substantially corresponds to the curvature of the blade.

In an embodiment, the support device comprises a first part having a first width connected to the slat device and a second part having a second width being smaller than the first width, the second part connecting the first part to the blade. The difference in widths is contemplated to allow the slat device, while being connected to the blade, to be subjected to lower loads, compared to a device not having the second part, during operation of the wind turbine. The second part is contemplated to distribute loads originating from movements in the blade whereon the slat device is mounted. The combination of the first and second parts is further contemplated to provide more flexibility to the support.

In an embodiment, the second part is connected to the surface of the wind turbine blade via a third part having a third width being larger than the second width. The third part is contemplated to improve the strength of the slat device further and to reduce the risk of detachment of the slat device when being subjected to loads.

In an embodiment, the support foot is detachable from the support device. A detachable support foot is contemplated to allow for the attachment of the support foot and subsequently attachment of the slat device when mounting the assembly on a blade.

In one embodiment, the blade comprises indentations or a milled groove for receiving the foot. Thereby, the outer surface of the foot may flush with the profiled contour, thereby preventing the foot from being detached from the blade and reduce noise. The foot may also be tapered in order to provide a gradual transition in the transverse direction of the blade. The foot may also be sealed with an adhesive or other suitable material in order to remove discontinuities on the surface of the blade.

The wind turbine blade may be provided with a local reinforcement for attaching the support device to the blade itself. The local reinforcement may for instance comprise additional layers of fibre material, e.g. glass fibres, or wood or another suitable material. The local reinforcement may be arranged at an outer surface and/or an inner surface of a shell part of the wind turbine blade.

The foot of the support device may be formed by the support device being provided with a bend of e.g. 90 degrees so that a lower part of the support device forms the foot.

The foot of the support device may be attached to the wind turbine blade by of nuts and bolts means. The nuts and bolts means may be provided with rubber disks for providing a spacing between the foot and the blade surface. The nuts and bolts means may also be provided with a washer for distributing loads from the nut.

In another embodiment, the support device includes a connector comprising a rod end which is attached to a shell part of the blade via a bolt.

In an embodiment, the slat assembly is an assembly comprising a first part comprising a suction side of the slat device and the support device and a second part comprising a pressure side of the slat device, alternatively the slat assembly is an assembly comprising a first part comprising a suction side of the slat device and a second part comprising a pressure side of the slat device and the support device. In an embodiment, a plurality of first parts is provided, and the plurality of first parts each comprises feet with different geometries, each configured to a specific profiled contour.

In an embodiment, the support device comprises bars connecting the slat device with the surface of the blade. In an embodiment, the bars are adjustable, e.g. in length. In an embodiment an adjustable bar comprises a threaded bar, a bar with a cylinder and/or interlocking bars.

In an embodiment, the slat device and the support device are constituted by separate devices that may be assembled.

In an embodiment, the slat device is attachable to the support device via an adaptor module, the adaptor module being releasably connectable to the support device, alternatively the adaptor module being integrated with the support device.

In an embodiment, the slat device is movable relative to the support device. Preferably, the slat device is movable relative to the support device only while being mounted, and the relative position of the slat device may be adjusted. During operation of the wind turbine, the orientation of the slat device is fixed relative to the blade.

In an embodiment, the slat device and/or the support device is made of steel, a composite material, aluminium, plastic or other materials or a combination thereof. The specific choice of material may depend on the specific application of the slat device, e.g. one material may be chosen for a wind turbine that is to be operated at sea while another material may be chosen for a land-based turbine.

In an embodiment, the slat device comprises a plurality of individual slat devices. If a relatively long slat device is to be mounted on a blade, it may be preferred to employ several, shorter, slat devices instead of one long slat device.

This may also help reduce the effect of loads from twist and bending of the blade, since loading on one slat part does not translate to other parts of the slat device.

In an embodiment, two neighbouring slat devices are connected via a common support device, such as a common end plate. This is contemplated to ease mounting of the slat devices and may also reduce the number of support devices used to fasten the slat device to the blade.

In an embodiment, the length of the slat device is 0.5 to 5 meters, or such as 1 to 3 meters, or such as 0.5 to 1 meter, or such as 1 to 2 meters, or such as 2 to 3 meters, or such as 3 to 4 meters, or such as 4 to 5 meters, advantageously around 2.5 meters. The actual choice of length of one or more slat devices may depend on a specific blade on which the slat device is to be mounted. According to another embodiment, the slat is modularly formed so that the slat comprises smaller slat parts of e.g. 0.5 to 2 meters.

The slat may e.g. comprise 2, 3, 4, 5, or even more slat parts, advantageously arranged in longitudinal extension of each other. The modular construction makes the slat more flexible and reduces peel forces at the ends of slat. Thus, the modular parts have a smaller tendency to break off from the surface of the blade.

In an embodiment, the slat device comprises webs and/or balsa panels and/or a load carrying structure, such as a main laminate, located in a shell part of the slat device. It is contemplated that the slat device may be constructed in a manner similar to that of the profiled contour or main blade itself.

In an embodiment, the slat device comprises a core material covered with a hard material, such as plastics or a fibre reinforced polymer material.

In an embodiment, the suction and pressure side of the slat are formed by a shell, which may be substantially hollow. In a further embodiment, the shell may be partly filled with a light-weight material. In a still further embodiment the light-weight material is PU foam, PVC foam or another foamed polymer. In a still further embodiment the shell may be entirely filled with a light-weight material In an embodiment, the slat device comprises two beams arranged through the slat, the beams being arranged and adapted to carrying loads. In an embodiment, a beam of the slat device is connected to a support device. In principle, only a single beam may be used, but the use of two beams limits the movement of the slat, thus securing the slat in a fixed position and orientation relative to the surface of the blade.

In an embodiment, the support device may include two legs extending from an area of the support device where the slat device is attached. The support device may comprise more than two legs, such as three, four or even more. The legs connect the area where the slat device is attached to the surface of a wind turbine blade, possibly via a connection part such as foot or the like.

In an embodiment, the support device may be manufactured from a material in one piece. The one piece material may be processed so that desirable geometries are established. Desirable geometries include but are not limited to one or more legs, cut-out areas, such as triangular area, or combinations of geometrical shapes. The support device may be manufactured from two or more pieces of material and similar desirable geometries may be established using the pieces of material.

Advantageously, the slat is arranged so that it extends along at least a part of the transition region of the blade. It may also extend into the root part of the blade or be arranged along the root part only. In another embodiment, the slat also extends along an inboard part of the airfoil region. Accordingly, the slat may extend along a part of the root region, along the entire transition region, and along an inboard part of the airfoil region of the blade.

Advantageously, the slat is arranged near the leading edge of the blade.

An aspect of the present invention relates to a wind turbine comprising a number, advantageously two or three, of wind turbine blades or profiled contours according to the first aspect of the present invention.

According to yet another aspect, the invention provides a method of retrofitting a slat assembly according to any of the aforementioned embodiments to the surface of a wind turbine blade.

BRIEF DESCRIPTION OF THE DRAWINGS

The present invention will be explained in more detail with reference to the figures, in which.

DETAILED DESCRIPTION OF THE INVENTION

Figure 1:
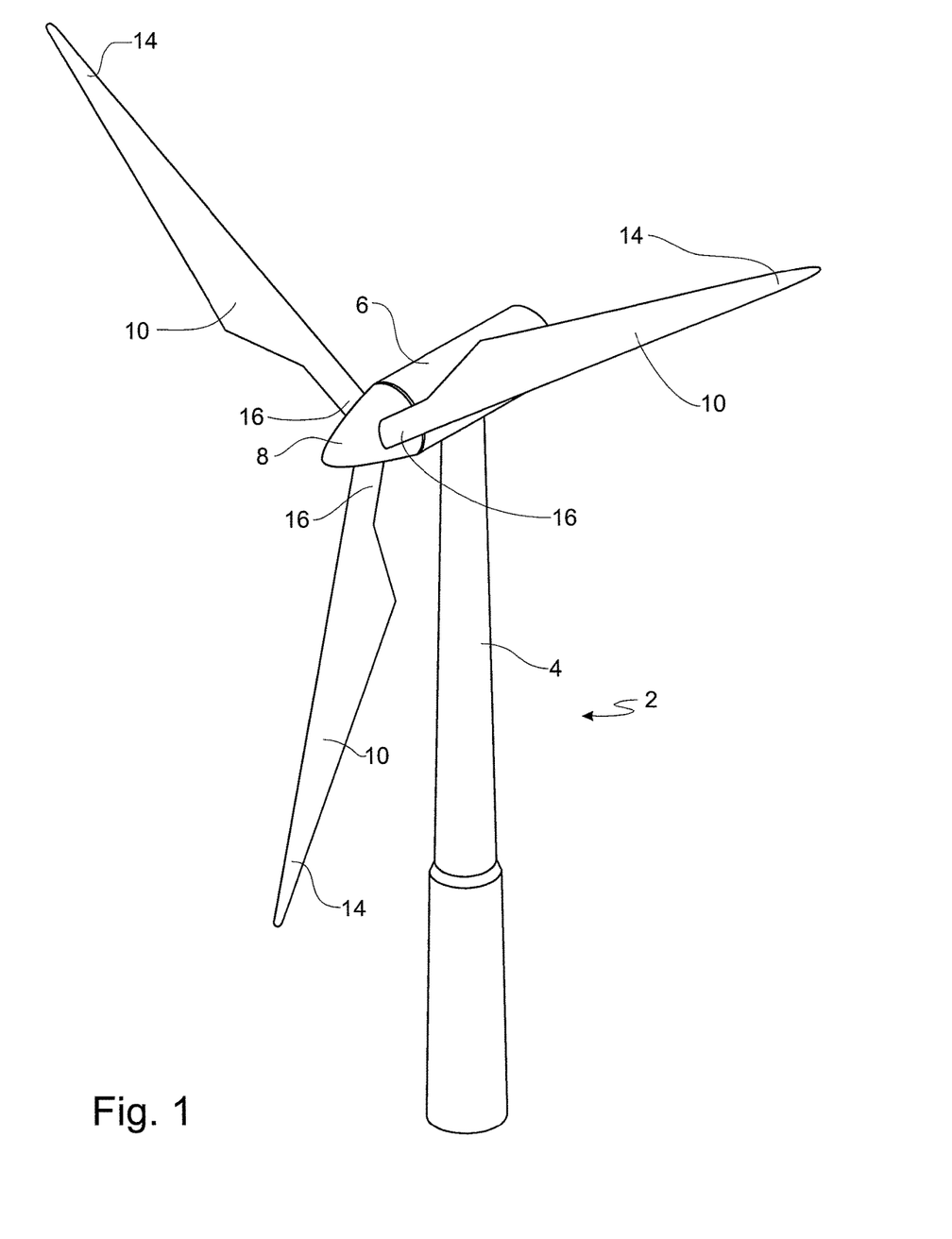
FIG. 1 is a schematic illustration of a wind turbine.

FIG. 1 is a schematic illustration of a conventional modern upwind wind turbine 2 according to the so-called "Danish concept" with a tower 4, a nacelle 6 and a rotor with a substantially horizontal rotor shaft. The rotor includes a hub 8 and three wind turbine blades 10 extending radially from the hub 8, each having a blade root 16 nearest the hub and a blade tip 14 furthest from the hub 8.

Figure 3:
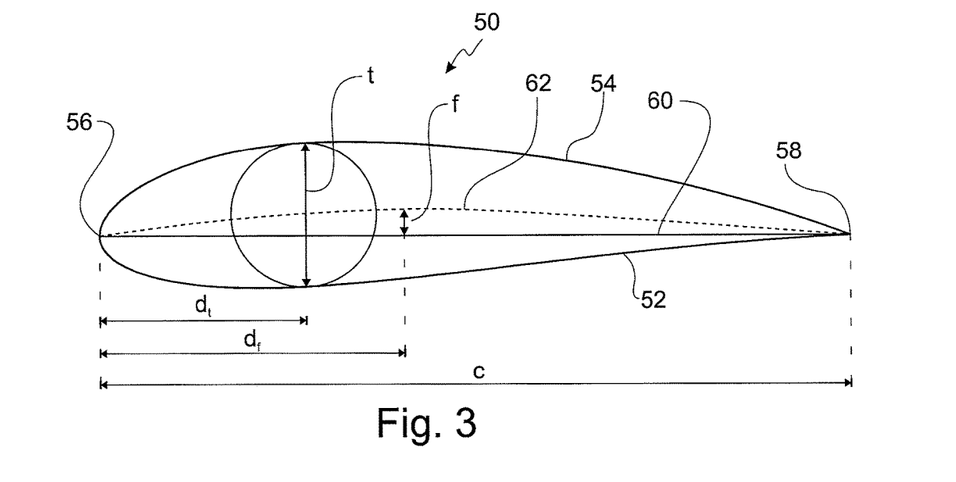
FIG. 3 is a schematic illustration of a cross-section of a blade.

FIG. 3 shows a schematic view of an airfoil profile 50 of a typical blade or blade of a wind turbine depicted with the various parameters, which are typically used to define the geometrical shape of an airfoil. The airfoil profile 50 has a pressure side 52 and a suction side 54, which, during use, normally face the windward side and the leeward side, respectively, i.e. during rotation of the rotor. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles, and the deviation or distance from the chord 60 is called the camber f. The asymmetry can also be defined by use of parameters called the upper camber and lower camber, which are defined as the distances from the chord 60 and the suction side 54 and pressure side 52, respectively.

Figure 2:
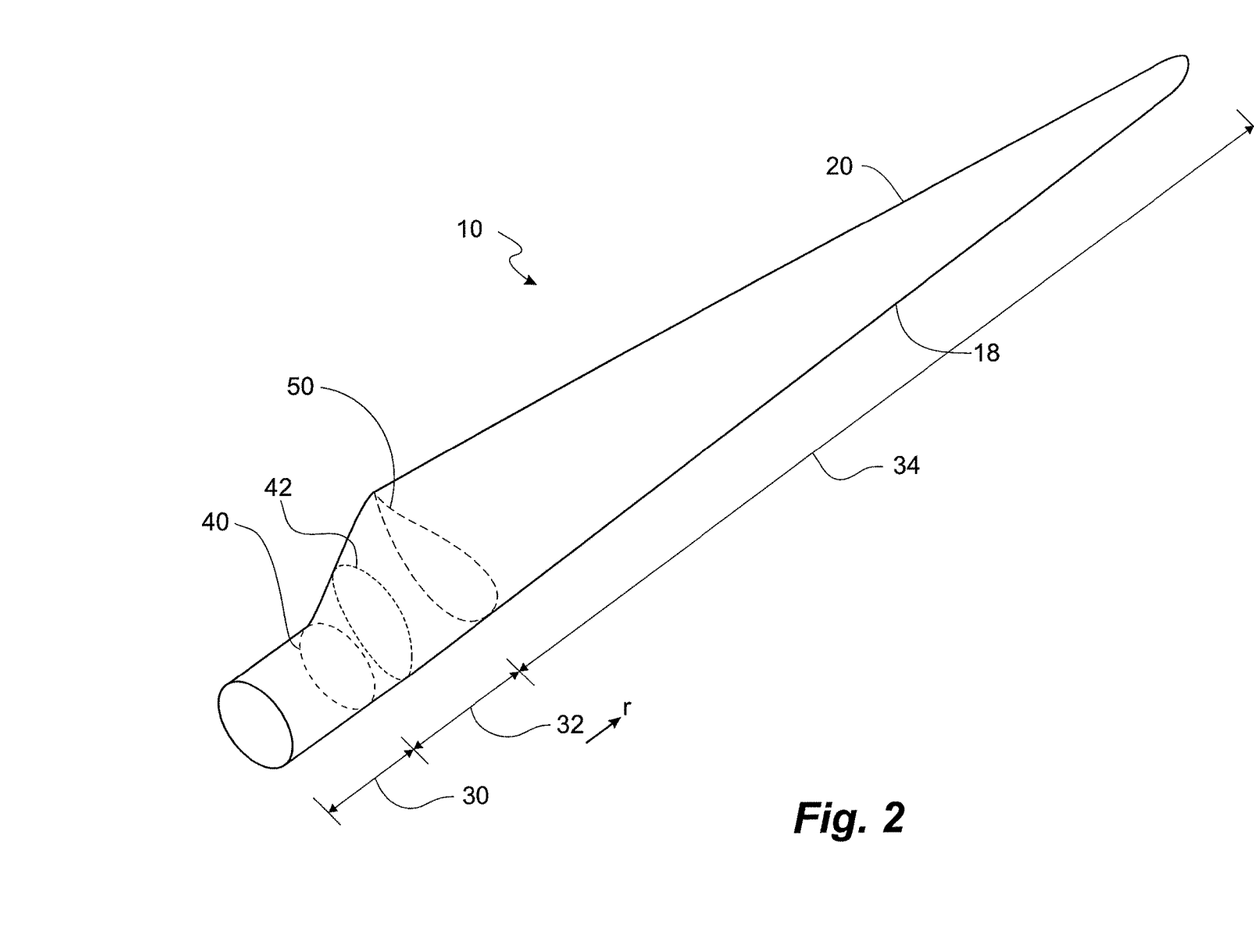
FIG. 2 is a schematic illustration of a wind turbine blade.

FIG. 2 illustrates a schematic view of an embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The wind turbine blade 10 comprises a leading edge 18 facing the direction of rotation of the blade 10, when the wind turbine blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 has a substantially circular or elliptical cross-section due to structural considerations, which for instance makes it easy and safe to mount the wind turbine blade 10 to the hub. Typically, the diameter (or the chord) of the root region 30 is constant along the entire root area 30. The transition region 32 has a transitional profile 42 gradually changing from the circular or elliptical shape 40 of the root region 30 to the airfoil profile 50 of the airfoil region 34. Typically, the width of the transition region 32 increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

Normally, the chords of different sections of the blade do not lie in a common plane since the blade may be twisted and/or curved (i.e. pre-bent) thus providing the chord plane with a correspondingly twisted and/or curved course, this most often being the case in order to compensate for the local velocity of the blade being dependent on the radius from the hub.

Figure 4:
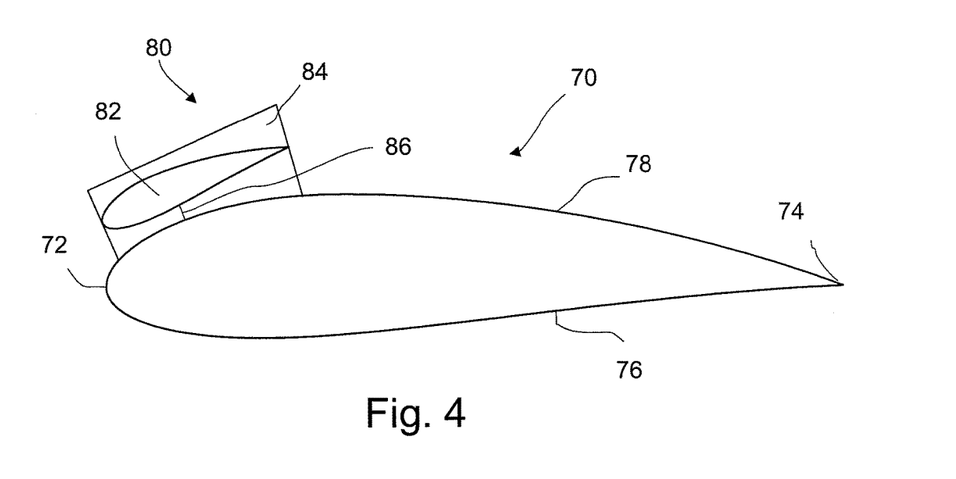
FIG. 4 is a schematic illustration of a blade provided with a slat assembly.

FIG. 4 is a schematic illustration of an airfoil profile or blade 70 for a rotor of a wind turbine. The intended wind turbine may be of the type illustrated in FIG. 1. The blade 70 defines a leading edge 72 and a trailing edge 74, a pressure side 76 and a suction side 78 connecting the leading edge 72 and the trailing edge 74. The blade 70 generates a lift when being impacted by an incident airflow. The blade 70 comprises a slat assembly 80 located on the blade 70. The slat assembly 80 comprises a slat device 82 being supported by a support device 84 positioning the slat device in a distance or with a spacing, indicated by the line 86, from the surface of the blade 70. In the figure, the slat is depicted as being positioned at the airfoil region of the blade. However, the slat will typically be arranged in the non-ideal region of the blade, e.g. along at least a part of the transition region and/or the root region of the blade. However, the slat may also extend into in inboard part of the airfoil region of the blade.

It is contemplated that the presence of a slat assembly 80 will improve the aerodynamic performance of the blade. Preferably, the support device 84 maintains the slat device in a fixed position and distance from the surface of the blade 70. The distance 86 may be individual for a specific blade profile and the position of the slat assembly 80 on the blade 70, i.e. the distance 86 may depend on the distance of the slat assembly 80 from the leading edge 72 of the blade 70.

The support device 84 may constitute a wall hindering air flowing in a direction substantially perpendicular to the support 84, i.e. air flow in the longitudinal direction of the blade 70. It is contemplated to reduce the flow separation if the air is not allowed or at least hindered in flowing in a direction parallel to the longitudinal direction of the blade 70. Thus, the wall may function so as to prevent e.g. a separated flow in propagating in the longitudinal or radial direction of the blade.

Figure 5:
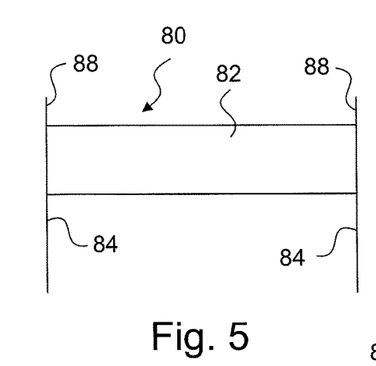
FIGS. 5-12 are schematic illustrations of slat assemblies.

FIG. 5 illustrates a slat assembly 80 schematically, said slat assembly 80 comprising an end plate 88 extending beyond the surface of the slat device 82, i.e. farther from the blade. In FIG. 4 this is the part of the support device 84 extending beyond the surface of the slat device 82. The end plate 88 is contemplated to lower flow separation in the area around the slat device 82 or in a separated flow in propagating along the longitudinal direction of the blade.

Figure 6:
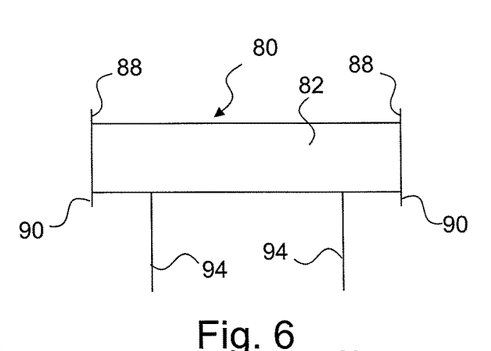
Figure 7:
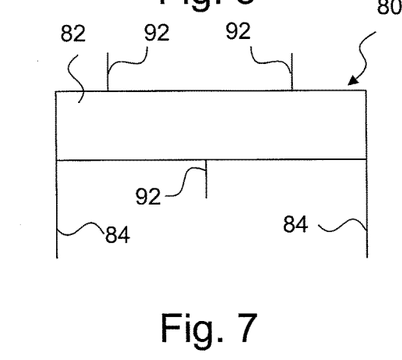
Figure 8:
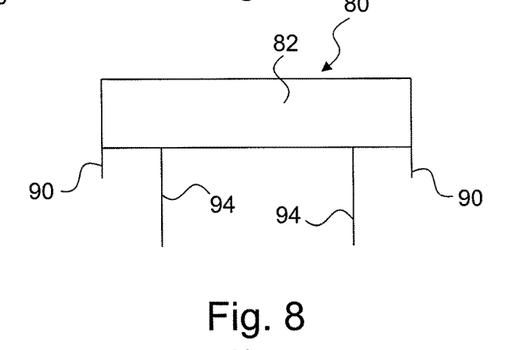

In FIG. 4, the end plate or support 84 extends in a direction away from the surface of the blade. In other embodiments a winglet may be provided and the winglet may extend in a direction towards the surface of the blade. In an embodiment a winglet may be provided and the winglet may extend in a direction away from the blade. This is illustrated in FIGS. 6, 7 and 8 by the winglet 90 and 92. In an embodiment, the slat assembly 80 may comprise winglets extending in both directions, such as illustrated in FIG. 6. The winglet may extend from the end of the slat device or the winglet may extend from the surface of the slat device at other positions, such as illustrated by the winglets 92 in FIG. 7.

FIG. 4 illustrates the slat assembly 80 positioned near the leading edge 72. The optimal position of the slat assembly 80 on the blade 70 may be influenced by several factors. One factor may be the deformation of the surface of the blade during operation. If the blade bends or flexes due to fluctuations in the inflow, there is a risk of the slat assembly 80 loosening from the surface of the blade 70. To reduce this risk, the slat assembly 80 may be positioned at the area least likely to deform or the area deforming the least, this includes, but is not limited to, the area at the main laminate, i.e. a load carrying structure located in a shell part of the blade itself.

The distance from the leading edge 72 to the centre of the slat assembly 80 may vary from 1 to 90% of the distance from the leading edge 72 to the trailing edge 74 (or chord length). This distance may be measured along the surface of the blade 70. The centre of the slat assembly may be projected to the surface of the blade 70 when determining this distance.

FIG. 5 further illustrates that the support device 84 is attached to the slat device 82 at one end of the slat device 82. In FIGS. 6 and 8, the support device 94 is attached to the slat device 82 at the pressure side of the slat device 82. The support device 84 may support or attach to the slat device 82 at the ends of the slat device 82. In an embodiment, the support device 84 may comprise at least one part being attached to the slat device 82 at a distance from the end of the slat device 82, i.e. one support may be attached similar to the support 94 illustrated in FIG. 6 and one support may be attached similar to the support 84 illustrated in FIG. 5.

FIG. 6 illustrates a slat assembly 80 where end plates 88 extend beyond the surface of the slat device 82. Winglets 90 extend from the end of the slat device 82 so that when the slat assembly 80 is mounted to a blade the winglets 90 extend in a direction towards the surface of the blade.

FIG. 7 illustrates a slat assembly 80 where winglets 92 extend from the surface of the slat device 82. The winglets 92 extend from the slat device 82 so that when the slat assembly 80 is mounted to a blade that some of the winglets 92 extend in a direction towards the surface of the blade while others extend away from the surface of the blade.

FIG. 8 illustrates a slat assembly 80 where winglets 90 extend from the end of the slat device 82. The winglets 90 extend from the slat device 82 so that when the slat assembly 80 is mounted to a blade the winglets 90 extend in a direction towards the surface of the blade.

Figure 9:
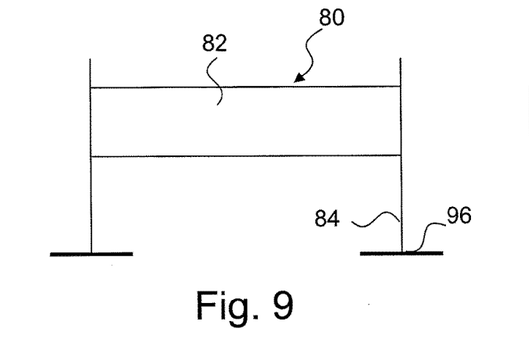

In FIG. 9, the support device 84 may comprise a support foot 96 adapted to the blade at the area where the support device 84 is fastened to the blade. Thus, the support foot may be curved so as to substantially follow the surface curvature of the blade. Further, a support material between the support device 84 and the blade may be provided. This material may for instance be a rubber material. A bolt may be provided to establish a mechanical fastening between the support device 84 and the blade. This may be in combination with the aforementioned support material and/or other attachment options, such as glue and mechanical connectors. Fastening of the slat assembly is discussed in more detail with reference to FIGS. 27-29.

In the assembly or package constituting a slat assembly, it is contemplated to be cheaper to replace only one part, e.g. the bottom or top module instead of building an entire new unit in order to adapt the slat assembly to a specific blade. Further, a variety of support feet adapted for a variety of blades may be provided. Different support parts may allow the assembly to fit to different positions of the slat device relative to the blade surface.

As the support foot 96 may be detachable from the support device 84, it is contemplated that the support foot 96 may be adapted or configured to provide a good, stable connection to the surface of a specific blade or a specific location on the blade. It is contemplated that a variety of foot devices may be supplied, each specific foot device adapted for a specific blade or specific location on a blade. The slat device may then be provided having one specific profile and when combined with different feet, the assembly may fit a large number of different blades or different positions on a blade.

Figure 17:
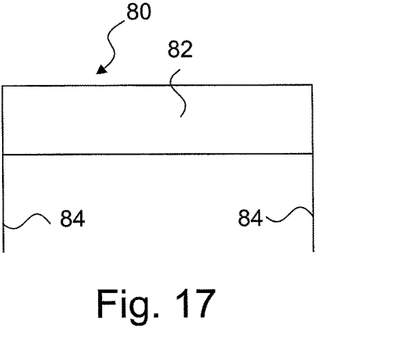
FIG. 17 is a schematic illustration of a slat assembly.

FIG. 17 is a schematic illustration of a slat assembly 80 with a support device 84. The support device 84 may be of any of the types described herein. The slat assembly 82 illustrated here does not include end plates or winglets extending beyond the surface of the suction side of the slat device 82.

Figure 10A:
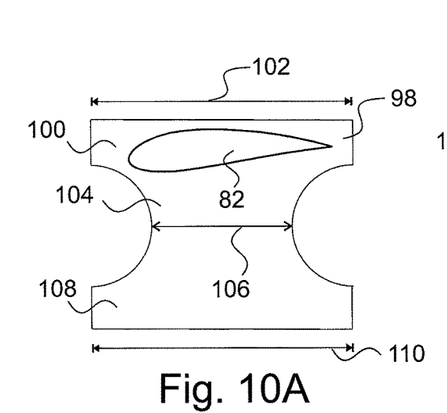

FIG. 10A illustrates a support device 98 schematically, said support device 98 comprising a first part 100 having a first width 102. The first part 100 is connected to the slat device 82. The support device 98 further comprises a second part 104 having a second width 106. The second width 106 is smaller than the first width 102. The second part 104 is connected to the surface of the blade via a third part 108 having a width 110 being larger that the width of the second part 104.

Figure 10B:
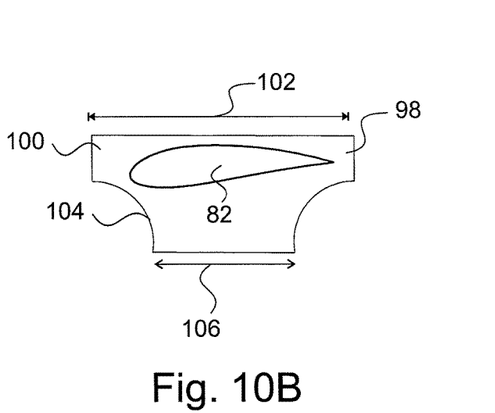

FIG. 10B illustrates a support device 98 schematically, said support device 98 comprising a first part 100 having a first width 102. The first part 100 is connected to the slat device 82. The support device 98 further comprises a second part 104 having a second width 106. The second width 106 is smaller than the first width 102. The second part 104 connects the first part 100 to the blade.

Generally, it is an advantage that the wider first part connects the support to the slat device via other parts, e.g. the provision of a smaller second part is contemplated to ensure that the loads induced by changes or movement of surface of the blade due to e.g. deformations do not result in the slat assembly disconnecting from the blade. By utilising a modular design, the stiffness of the slat is reduced and loads and stresses are alleviated. Other geometries of the support device are illustrated in FIGS. 22-25.

Figure 11:
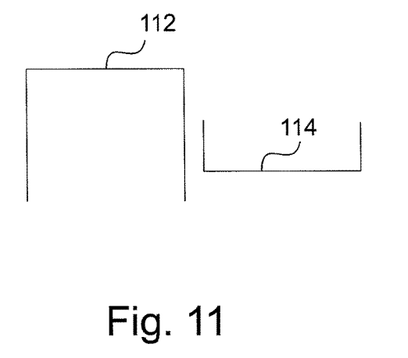

FIG. 11 illustrates a slat assembly schematically, said slat assembly being an assembly comprising a first part 112 comprising the suction side of the slat device and the support device and a second part 114 comprising the pressure side of the slat device. In order to assemble the slat assembly the second part 114 is inserted into the first part 112 and the two parts 112, 114 are adhered to each other. The design may be provided with or without a support foot.

Figure 12:
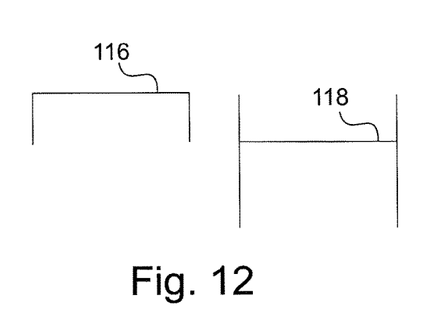

FIG. 12 illustrates a slat assembly schematically, said slat assembly being an assembly comprising a first part 116 comprising the suction side of the slat device and a second part 118 comprising the pressure side of the slat device and the support device. In order to assemble the slat assembly the first part 116 is inserted into the second part 118 and the two parts 116, 118 are adhered to each other.

The embodiments shown in FIG. 11 and FIG. 12 have in common that one part of the slat device is connected to the support device, whereas a second part of the slat device is adhered to the first part so as to form the slat device.

It is contemplated to reduce production complexity to manufacture the slat assembly in two parts. The joints between the slat device and the support devices are contemplated to be strong. Winglets or end plates may be attached after the slat assembly has been assembled.

Advantageously, a plurality of first parts 114, 118 may be provided, and the plurality of first parts 114, 118 each comprises feet with different geometries. This is contemplated to provide a variety of attachment possibilities as each foot is configured to either a specific blade or a specific location on the blade. By using different feet, the slat assembly may be adjusted in several ways, e.g. by locating the slat assembly at one of a variety of positions on the surface of the blade.

Figure 13:
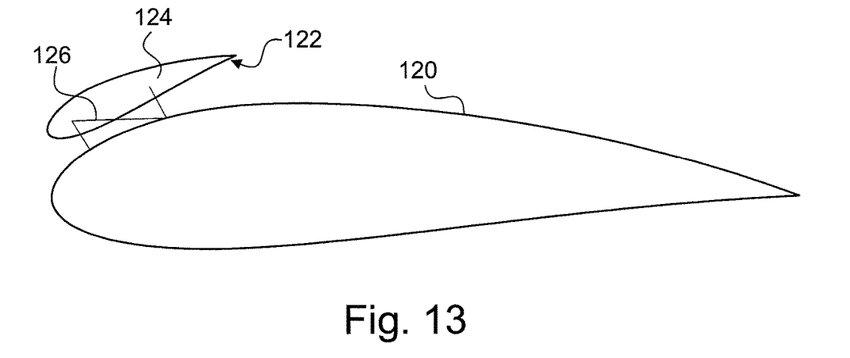
FIG. 13 is a schematic illustration of a blade provided with a slat assembly.

FIG. 13 is a schematic illustration of a blade 120 having a slat assembly 122. The slat assembly 122 comprises a slat device 124 being attached to the blade 120 by a support device 126. The support device 126 is constituted by bars. The bars connect the slat device 124 with the surface of the blade 120.

Advantageously, the bars 126 could be constituted by adjustable bars. An adjustable bar is contemplated to allow a person mounting the slat assembly on a blade to obtain a specific distance and orientation and to allow adjustment to establish a specific distance between the blade surface and the slat device when the slat assembly has been mounted at a specific position on the blade. Generally, it is contemplated that slat assemblies may be positioned at a variety of places on a blade. There may be various optimal distances between the blade surface and the slat device depending on where the slat assembly is positioned on the blade.

Advantageously, an adjustable bar could be constituted by a threaded bar, a bar with a cylinder and/or an interlocking bar. Other forms of adjustments may be used.

Using bars is contemplated to allow easy adjustment of the position of the slat device relative to the blade, e.g. by changing the length of one or more bars.

In an embodiment, the slat device and the support device are constituted by separate devices that may be assembled. It is contemplated to be easier to manufacture separate parts than having to manufacture the entire slat assembly in one piece.

Figure 14:
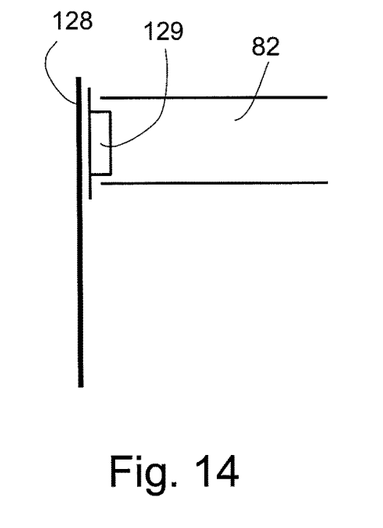
FIG. 14 is a schematic illustration of a part of a slat assembly.

FIG. 14 illustrates an embodiment schematically, where the slat device 82 is attachable or detachably coupled to the support device 128 via an adaptor module or device 129. The adaptor module 129 is releasably connectable to the support device 128. The use of an adaptor module 129 is contemplated to allow the use of several different support devices for different blades while using a lower number of slat device profiles. The module 129 may be glued or welded or otherwise adhered to the support device 128.

The slat device 82 may be glued to the adaptor device 129. It is contemplated to be possible to adjust the slat device after the glue hardens by adjusting the angle of the assembled slat device 86 and module 129 relative to the support 128. Typically, however, it is not desired to move the components relative to each other after applying glue.

Figure 15:
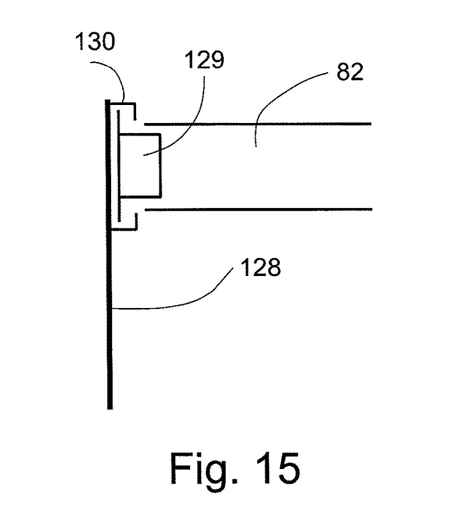
FIG. 15 is a schematic illustration of a part of a slat assembly.

FIG. 15 illustrates an embodiment schematically, where the slat device 82 is attachable or detachably coupled to the support device 128 via an adaptor module 129 similar to that shown in FIG. 14. In FIG. 15, the adaptor module 129 is attached to the support device 128 by a holding member 130. The holding member 130 may support and hold or retain the module 129 along its entire periphery. The holding member 130 may be constituted by a number of individual holding members, not illustrated. The holding member 130 may be fastened to the support device 128 by integrating the holding member 130 in the support device 128, e.g. by adding a layer of glass fibre to the support device, whereby the holding member 130 is fastened to the support device 128.

In an embodiment, the slat device may be movable relative to the support. An advantage of the slat device being movable relative to the support is that the slat device may be adjusted when mounting the slat assembly to the blade. The angle of the slat device relative to the blade may have an effect on the aerodynamics of the combined system as well as the size of the slot formed between the slat device and the surface of the blade. In the embodiment on FIG. 14, the orientation of the slat device 82 may be adjusted before the glue hardens and the orientation of the slat device 82 is fixed.

The slat device and/or the support device may be made of steel, a composite material, aluminium, plastic or other materials or a combination of various materials. The choice of material may depend on the material of the blade and/or expected device lifetime. Also, some materials may be better suited for certain environments. There are definite differences between conditions in offshore environments and other environments, such as countryside.

Figure 16:
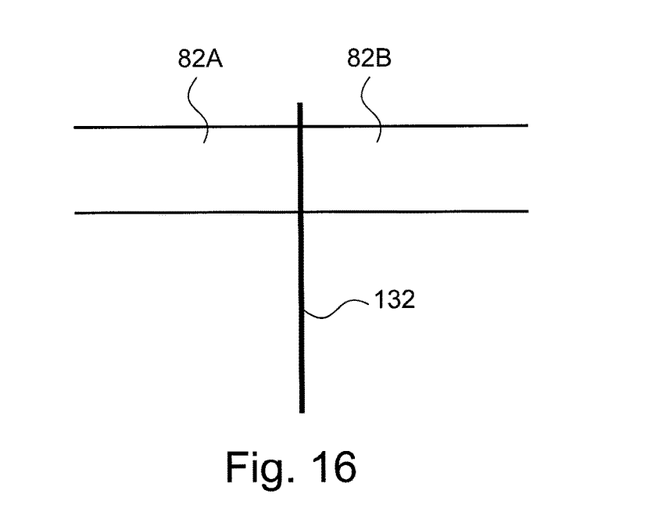
FIG. 16 is a schematic illustration of a part of a slat assembly having two slat devices.

FIG. 16 illustrates an embodiment schematically, where a support device 132 acts as a common support for two slat devices 82A and 82B. An advantage is a reduced number of support devices when mounting a slat assembly comprising two or more slat devices 82. An advantage is that the slat assembly may comprise multiple slat devices and that any loads due to deformation of the blade will not cause the slat assembly to be loosened from the blade.

The support device may be attached to the blade at the entire blade profile surface, i.e. around the blade profile at the cross-section, or at a few points on the surface. By making the attachment at single points, the loads at the slat and/or supports would be more or less independent of the blade cross-section deformation.

Figure 18:
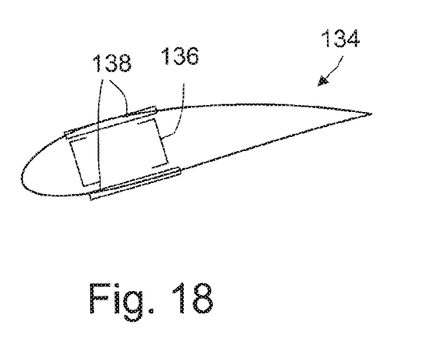
FIG. 18 is a cross-sectional schematic illustration of a slat device.

FIG. 18 is a schematic cross-sectional view of a slat device 134. The slat device 134 is constructed similarly to a blade for a wind turbine. The slat device 134 comprises webs 136, balsa panels and main laminates 138, i.e. a load carrying structure located in the shell part of the slat device 134.

Figure 19:
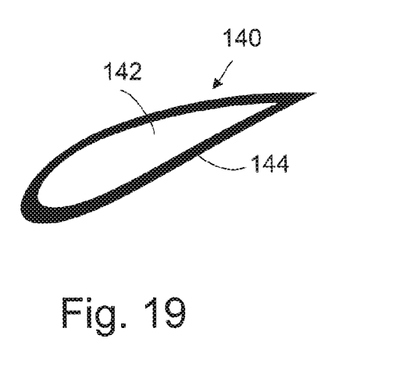
FIG. 19 is a cross-sectional schematic illustration of a slat device.
Figure 20:
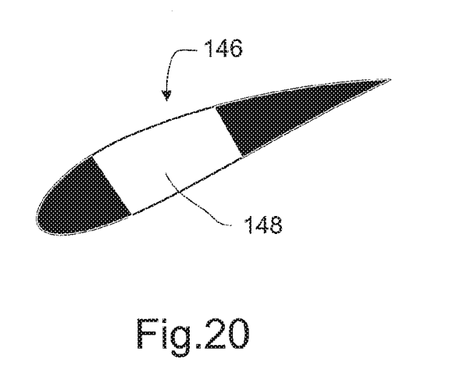
FIG. 20 is a cross-sectional schematic illustration of a slat device.

FIG. 19 is a schematic cross-sectional view of a slat device 140. A core material 142 is covered with a hard material 144, such as a plastic or a fibre reinforced polymer material, i.e. covered with a shell. FIG. 20 is a schematic cross-sectional view of a slat device 146. The suction and pressure side are made without a core material. The slat device 146 could be filled partly or entirely with e.g. PU foam or another light weight material 148, e.g. covered with a skin or shell. Also foam blocks (e.g. PVC) could be used instead of filling in material.

Figure 21:
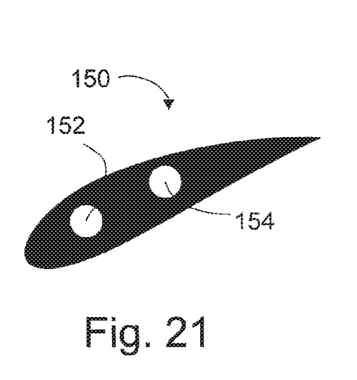
FIG. 21 is a cross-sectional schematic illustration of a slat device.

FIG. 21 is a schematic cross-sectional view of a slat device 150. The slat device 150 comprises two beams 152, 154 through the slat 150 for carrying the loads. Then the profile 150 only provides the aerodynamic shape and it could be made as a low strength construction. The beams 152, 154 could be connected to a support device, not seen here.

The different features of the slat devices illustrated in FIGS. 18-21 could be combined in any advantageous way.

The support devices illustrated in FIGS. 22-25 may take the role as any of the support devices illustrated in FIGS. 4-16. Different support devices may be combined in one slat assembly.

Figure 22:
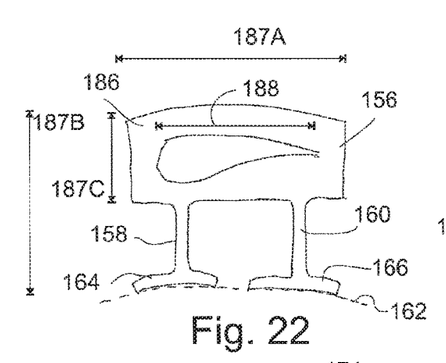
FIGS. 22-25 are schematic illustrations of embodiments of slat assemblies.

FIG. 22 is a schematic view of a support device for supporting a slat device 82. The support device 156 comprises two legs 158 and 160 connecting the device to a wind turbine blade surface, indicated by the punctured line 162. As with the support device in FIGS. 10A and 10B, the support device 156 is flexible and reduces the risk of the slat device being disconnected from the blade surface 162 when the blade deforms due to twists and bends. The two legs 158 and 160 include a foot part 164 and 166 respectively for securely attaching the support device 156 to the blade surface 162. In alternative embodiments the support device 156 may include more than two legs, such as three or four legs. The legs 158 and 160 are relatively slim so the foot part 164, 166 makes it possible to establish an enhanced or stronger grip or mount to the wind turbine blade surface 162.

Figure 23:
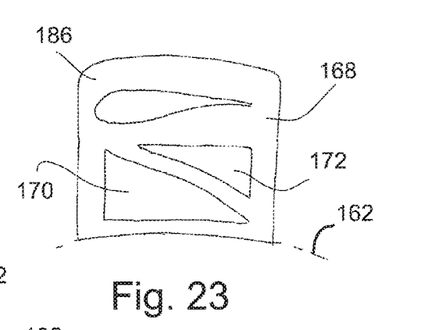

FIG. 23 is a schematic view of a support device 168. The support device 168 includes two cut-out areas 170 and 172. The cut-outs 170 and 172 relieve loads in the support device originating from deformations of the wind turbine blade surface 162, e.g. from ovalisation of the blade root. The support device may comprise two, three, four or more cut-out areas. The cut-out areas may, as illustrated in FIG. 23, have different sizes. In an embodiment two or more cut-outs may have similar or identical size, and/or same area.

The cut-outs 170 and 172 are illustrated as having right-triangular shapes. In another embodiment one or more cut-out areas may have an isosceles triangle shape, a square, a rectangular, or any other polygonal shape or combinations thereof. Further, one or more cut-outs may have a circular, elliptical, oval or other smooth shape or edge. The geometry may be established by using a plurality of parts or elements making up the support device 168.

Figures 24, 25:
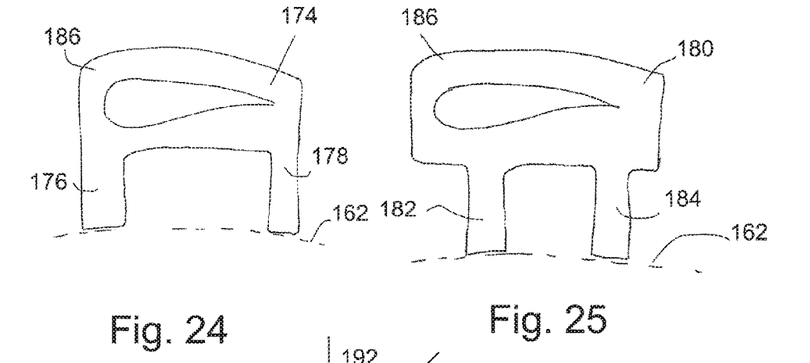

FIG. 24 is a schematic view of a support device 174. The support device 174 comprises two legs 176 and 178. The legs 176 and 178 are relatively wide compared to the legs 158 and 160. The legs 176 and 178 may be attached or mounted to the surface of the wind turbine blade 162 without the use of the foot parts 164 and 166 as the embodiment on FIG. 22.

In this embodiment, the legs 176 and 178 are located at the sides of the part of the support device 174 where the slat device is attached.

FIG. 25 illustrates an embodiment where the support device 180 also comprises two legs 182 and 184, but unlike the embodiment illustrated in FIG. 24, the legs 182 and 184 are located in a position away from the sides of the support device.

In the embodiments illustrated in FIGS. 22-25, the slat device is attached to the support device at a part of the support device denoted 186 in all embodiments. The specific form of the part 186 of the support device may be different from the exemplary illustration in FIGS. 22-25. Further, the orientation of the slat device in FIGS. 22-25 may in a specific embodiment be different from that illustrated in the figures.

In the embodiments illustrated in FIGS. 22 to 25, it is presently preferred that the support device has an overall width indicated by the line 187A in the range 900 to 1200 mm, preferably around 1000 mm. In the embodiments illustrated in FIGS. 22 to 25, the slat device has preferably an overall width or chord length indicated by the line 188 in the range 600 to 900 mm, preferably around 750 mm. Generally, the chord length of the slat device is 5-20% of the local chord length of the blade. The support may have a width being e.g. up to 20% wider than the chord length of the slat device.

In the embodiments illustrated in FIGS. 22 to 25, the part of the support device, where the slat is attached, has a height indicated by the line 187C in the range of 200 mm to 400 mm, preferably around 300 mm. In the embodiments illustrated in FIGS. 22 to 25, the support device has preferably an overall height indicated by the line 187B in the range 600 to 800 mm, preferably around 700 mm.

Figure 26:
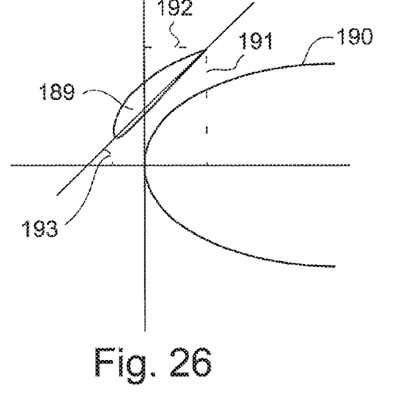
FIG. 26 is a schematic illustration of a blade and a slat device.

FIG. 26 illustrates schematically how the orientation and position of a slat device 189 relative to a wind turbine blade section 190 at a given distance from the blade root may be described. FIG. 26 illustrates some of the most relevant parameters. One parameter is G, which is a measure for the gap between the slat trailing edge 189 and the chord of the wind turbine blade section 190, indicated by the line 191. Another parameter is O, which is the overlap indicated by the line 192. The third parameter illustrated is D, which is the deflection, an angle indicated by the line 193. Depending on the aerodynamic, there will be an optimal combination of the above parameters.

For a specific section of the wind turbine blade which is orientated relative to the inflow in a specific desired distance, as an example 10 meters from the blade root, it would be desired to obtain a cl 1.7 at 14 degrees inflow angle or angle of attack. The drag should be as small as possible. For such a scenario, there will be one combination of the parameters G, O and D giving the desired lift. If several combinations yield the same lift it could be most desirable to select the combination giving the lowest drag and/or lowest maximum lift to decrease the maximum loads. The optimal combination will be different when considering a different section, e.g. 15 m from blade root. Further, the shape of the slat as well as the profile of the wind turbine blade near the slat will have an effect on the combination of the parameters giving the optimal lift.

From a certain point, the positive effect of the slat is reduced by increasing distance from the surface of the blade 190.

Figure 27:
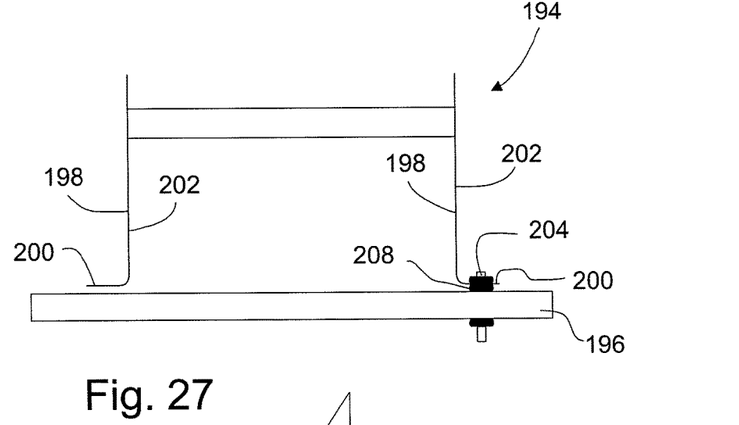
FIG. 27 is a schematic illustration of a slat assembly and part of a blade.

FIG. 27 schematically illustrates a slat assembly 194 where one side or leg is mounted to a blade 196. The slat assembly 194 comprises two legs both denoted 198. The legs 198 both include an area or part 200 that is bent 90 degrees relative to the part 202 of the leg 198 in order to provide an attachment foot 200. The angle of the part 200 relative to the part 202 may be chosen with the shape of the blade that the slat assembly 194 is to be mounted to in mind. The angle may thus be other than 90 degrees. The angle may be chosen so that the part 200 is substantially parallel with the part of the blade 196 that the part 200 is to be attached to. A bolt 204 is used for attaching the part 200 to the blade. A nut 206 locks the bolt 204 and area 200. Rubber discs 208 and 209 are provided for establishing a distance between the part 200 and the surface of the blade 196 so that the two do not inflict damage to each other and the connection is somewhat flexible.

Figures 28, 29, 30:
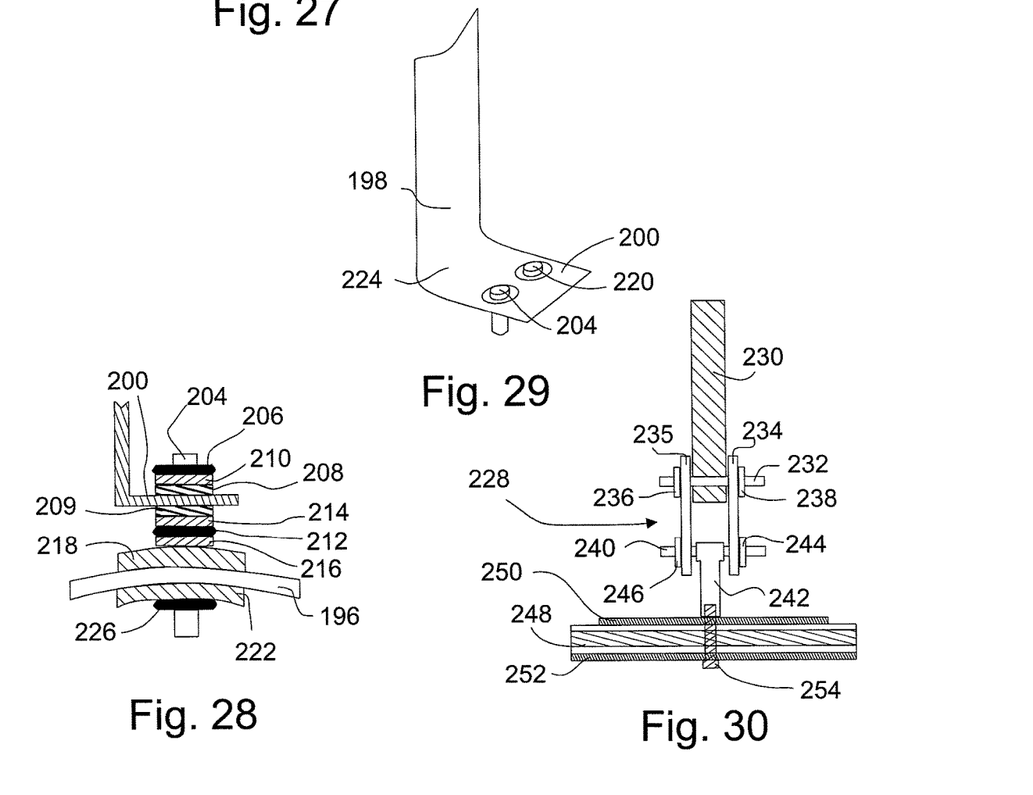
FIG. 28 is a zoomed view of a connection between a support device and a blade.
FIG. 29 is a schematic partial view of a support device.
FIG. 30 is a schematic view of a connector for connecting a support with a blade, and FIG. 31 diagrammatically illustrates an alternative mounting of a rod end of a connector to a surface of the wind turbine blade.

FIG. 28 is a zoomed view of a connection between the part 200 and the blade 196. FIG. 28 illustrates more details than FIG. 27.

In FIG. 28, a washer 210 is positioned between the nut 206 and the rubber disc 208. In FIG. 28, three nuts are provided denoted 206, 212 and 226. The washer 210 distributes the load from the nut 206. Further, the washer 210 provides spacing between the area 200 and the blade. In an embodiment, the washer may be a rubber washer or may alternatively be made from metal, such as steel, stainless steel or plastic or any other suitable material.

The rubber discs 208 and 209 provide vibration dampening and add spacing between the area 200 and the blade 196. A nut 212 is provided between two washers 214 and 216.

Reinforcement 218 is provided at the outer surface of the blade 196. The reinforcement 218 is provided to ensure that the blade is capable of retaining the slat assembly during use of the wind turbine blade. The loads transferred to the connection between the blade and the slat assembly may cause cracks and fractures in the blade. The reinforcement 218 distributes the loads from the connection between the area 200 and the blade 196 and loads originating from deformation of the blade.

A second reinforcement 222 is provided inside the blade 196. The second reinforcement 222 provides further strength to the structure. The second reinforcement 222 distributes loads from the connection between the area 200 and the blade 196 and loads originating from deformation of the blade.

FIG. 29 is a perspective view of a part of the leg 198 and the part 200. The bent section 224 includes a smooth transition from the leg 198 to the area 200. The area 200 includes two bolts 204 and 220. The bolt 220 may be fastened using a similar arrangement as described in relation to the bolt 204 illustrated in FIG. 28. Compared to FIG. 28 FIG. 29 is simplified for illustrative purposes regarding the connection of the bolts 204 and 220.

Regarding embodiments of supports having an area corresponding to the area 200 the area preferably has a width in the range of 70 mm to 90 mm, preferably around 80 mm, and a length in the range of 40 mm to 60 mm, preferably around 50 mm.

FIG. 30 illustrates an embodiment of a connector 228. The connector 228 connects a support leg or foot 230 to the blade shell 248 of a wind turbine blade. A bolt 232 is arranged to pass through a hole in the support leg or foot 230. The bolt 232 connects two supporting plates 234 and 235 to the support leg or foot 230. One or two further bolts, not illustrated here, may be provided to ensure that the orientation of the plates 234 and 235 is fixated relative to the support leg or foot 230. The bolt 232 is secured by two nuts 236 and 238. Alternatively, or in combination herewith, the plates 234 and 235 may be glued to the support leg or foot 230.

A bolt 240 is provided at the support leg or foot 230 opposite the bolt 232. The bolt 240 connects the plates 234 and 235 with a rod end 242. The bolt 240 is received in the rod end 242 so that the support leg or foot 230 may pivot. Preferably, the support leg or foot 230 is only able to pivot slightly so as to allow the support device to be adjusted. The bolt 240 is held in place by two nuts 244 and 246.

The rod end 242 is attached to the wind turbine blade at the blade shell 248 via a through-going bolt 254. Reinforcement areas 250 and 252 are provided to increase strength of the blade shell 248 so as to reduce risk of cracks in the blade shell when loads are transferred from the slat and/or support to the blade shell 248.

Advantageously, the connector 228 may be used to connect support devices such as those illustrated in FIGS. 24 and 25. Other types of support devices may also be attached using this connector if suitable.

Figure 31:
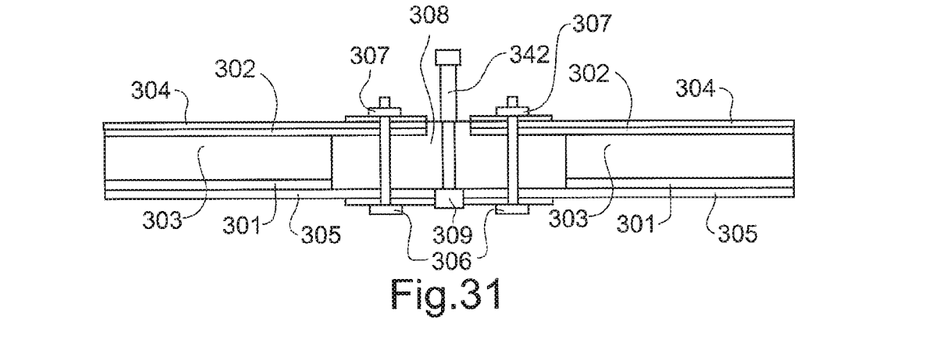

FIG. 31 illustrates an alternative embodiment for mounting a rod end of a connector 228 to the surface of the blade. The blade may for instance comprise a sandwich construction comprising an inner skin 301 and an outer skin 302, e.g. comprising reinforcement fibres such as fibre glass, with an intermediate core material 303, e.g. made of balsa wood or foamed polymer. A metal insert 308, e.g. made of steel, is inserted into the blade between inner reinforcement laminates 305 and outer reinforcement laminates 304 and via bolts 306 and nuts 307. The rod end 342 may thus be connected to the blade via a main bolt 309 inserted through the metal insert 308.

The invention claimed is:

1. A wind turbine blade for a rotor of a wind turbine having a substantially horizontal rotor shaft, the rotor comprising a hub from which the blade extends in a substantially radial direction when mounted to the hub, the wind turbine blade comprises:
   a profiled contour defining a leading edge and a trailing edge, a pressure side and a suction side connecting the leading edge and the trailing edge, the profiled contour generating a lift when being impacted by an incident airflow; and
   a slat assembly located on the blade, the slat assembly comprising
      a slat device being supported by a support device positioning the slat device a distance from the surface of the blade,
      wherein the slat assembly comprises a first part and a second part, the first and second parts being adhered to one another, the first part including the support device and a suction side of the slat device, the second part including a pressure side of the slat device.

2. The wind turbine blade according to claim 1, wherein the support device comprises a wall hindering air flowing in a direction substantially perpendicular to the support.

3. The wind turbine blade according to claim 1, wherein the support device is attached to the slat device at one end of the slat device and/or the support device is attached to the slat device at a pressure side of the slat device.

4. The wind turbine blade according to claim 1, wherein the support device comprises a first part having a first width connected to the slat device and a second part having a second width being smaller than the first width, the second part connecting the first part to the blade.

5. The wind turbine blade according to claim 4, wherein the second part is connected to the surface of the wind turbine blade via a third part having a third width being larger than the second width.

6. The wind turbine blade according to claim 1, wherein a plurality of the first part are provided, and the plurality of the first part each comprise feet with different geometries, each said foot being configured to a specific unique profiled contour.

7. The wind turbine blade according to claim 1, wherein the slat device and the support device are constituted by separate devices that may be assembled and/or the slat device is attachable to the support device via an adaptor module, the adaptor module being releasably connectable to the support device.

8. The wind turbine blade according to claim 7, wherein the adaptor module is integrated with the support device.

9. The wind turbine blade according to claim 1, wherein the slat device comprises a plurality of individual slat devices.

10. The wind turbine blade according to claim 9, wherein two neighbouring slat devices are connected via a common support device.

11. The wind turbine blade according to claim 1, wherein the slat device comprises webs and/or balsa panels and/or a load carrying structure.

12. The wind turbine blade according to claim 11, wherein the webs and/or balsa panels and/or the load carrying structure is a main laminate.

13. The wind turbine blade according to claim 1, wherein the slat device comprises two beams arranged through the slat, the beams being configured to carrying loads, and being connected to the support device of the slat assembly.

14. The wind turbine blade according to claim 1, wherein the support device comprises bars connecting the slat device with the surface of the blade.

15. The wind turbine blade according to claim 14, wherein the bars are adjustable in length.

16. The wind turbine blade according to claim 1, wherein the support device includes a connector comprising a rod end which is attached to a shell part of the blade via a bolt.

17. The wind turbine blade according to claim 1, wherein the slat assembly is attached so that the slat device is positioned and oriented in a fixed position relative to the blade.

18. The wind turbine blade according to claim 1, wherein the support foot is detachably coupled to the support device.

19. The wind turbine blade according to claim 1, wherein the blade is provided with local reinforcements for attachment of the support device.

20. The wind turbine blade according to claim 19, wherein the local reinforcements for attachment of the support device are additional laminate layers or a metal insert.

21. The wind turbine blade according to claim 1, wherein the support device of the slat assembly is attached to the wind turbine blade by use of at least one nut and at least one bolt.

22. The wind turbine blade according to claim 21, further comprising one or more rubber disks contacting the support device for distributing loads from the at least one nut.

23. The wind turbine blade according to claim 1, wherein the support device comprises two support legs.

24. A method of retrofitting the slat assembly as described in claim 1 to a surface of the wind turbine blade.

25. A method according to claim 24, wherein the position of the slat device is positioned and oriented in a desired position relative to the blade and then fixed so as to maintain the desired position relative to the blade.

26. A method according to claim 24, wherein indentations or milled grooves are formed in the surface of the blade so as to receive a part of the support device.

27. A method according to claim 26, wherein the part of the support device is a support foot.

28. A method according to claim 24, wherein a local reinforcement of the blade is provided prior to retrofitting the slat assembly to the blade.

29. The wind turbine blade for a rotor of a wind turbine having a substantially horizontal rotor shaft as recited in claim 1, further comprising an end plate extending beyond a surface of the slat device and extending in a direction away from the surface of the blade, wherein the support device comprises a support foot adapted to the blade at an area where the support device is fastened to the blade, one end of the slat device being attached to the support device, and the end plate forming part of the support device.

30. A wind turbine blade for a rotor of a wind turbine having a substantially horizontal rotor shaft, the rotor comprising a hub from which the blade extends in a substantially radial direction when mounted to the hub, the wind turbine blade comprises:
  a profiled contour defining a leading edge and a trailing edge, a pressure side and a suction side connecting the leading edge and the trailing edge, the profiled contour generating a lift when being impacted by an incident airflow; and
  a slat assembly located on the blade, the slat assembly comprising a slat device being supported by a support device positioning the slat device a distance from the surface of the blade, wherein the slat assembly comprises a first part and a second part, the first and second parts being adhered to one another, the first part including the support device and a pressure side of the slat device, the second part including a suction side of the slat device.

31. The wind turbine blade for a rotor of a wind turbine having a substantially horizontal rotor shaft as recited in claim 30, further comprising an end plate extending beyond a surface of the slat device and extending in a direction away from the surface of the blade, wherein the support device comprises a support foot adapted to the blade at an area where the support device is fastened to the blade, one end of the slat device being attached to the support device, and the end plate forming part of the support device.

32. A wind turbine blade for a rotor of a wind turbine having a substantially horizontal rotor shaft, the rotor comprising a hub from which the blade extends in a substantially radial direction when mounted to the hub, the wind turbine blade comprises:
  a profiled contour defining a leading edge and a trailing edge, a pressure side and a suction side connecting the leading edge and the trailing edge, the profiled contour generating a lift when being impacted by an incident airflow; and
  a slat assembly located on the blade, the slat assembly comprising a slat device being supported by a support device positioning the slat device a distance from the surface of the blade, wherein the support device and a side of the slat device are integrally formed as an integral part, the pressure side of the slat device being adhered to the integral part, wherein the side of the slat device is selected from the group consisting of: a suction side of the slat device and a pressure side of the slat device.

* * * * *